Figure 1:
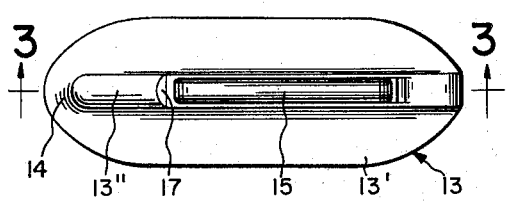

Nov. 15, 1966      L. L. RAGLIN      3,286,141

BASE MOUNTING STRUCTURE

Original Filed July 31, 1961

INVENTOR.
LOREN L. RAGLIN

BY Paul B. Hunter

ATTORNEY

United States Patent Office 3,286,141
Patented Nov. 15, 1966

3,286,141
BASE MOUNTING STRUCTURE
Loren L. Raglin, Mountain View, Calif., assignor to Granger Associates, Palo Alto, Calif., a corporation of California
Original application July 31, 1961, Ser. No. 128,165, now Patent No. 3,170,087, dated Feb. 16, 1965. Divided and this application Dec. 27, 1962, Ser. No. 247,733
2 Claims. (Cl. 317—262)

The present invention relates in general to base mounting members and more particularly to a novel improved form of base mounting member suitable, for example, for mounting elements such as static dischargers on airplane surfaces such as wing tips, elevators, and the like. The present invention is a division of U.S. patent application Serial No. 128,165 filed July 31, 1961, by Robert L. Tanner, Hugh D. Kennedy, and Loren L. Raglin entitled "Static Discharger Apparatus."

The present invention involves a novel base mounting member of advanced design and construction useful, for example, in the field of static discharge devices utilized on aircraft or the like for eliminating precipitation static interference. Static dischargers of various types have been very successfully employed in eliminating or at least reducing the precipitation static problem which occurs in aircraft, such static dischargers providing a means for producing corona discharges from the aircraft in such a manner as to result in a minimum amount of static interference in the antenna system of the craft. Such static dischargers may take many forms, including the well-known form of wick dischargers and the more recently conceived null field form of discharger described and claimed in U.S. Patent No. 2,933,732 and U.S. Patent No. 3,106,663 entitled "Low Noise Corona Discharge Devices" and the parent U.S. application of this divisional. In utilizing any of these prior art static dischargers, it is necessary to mount such discharge elements at the most effective locations on the aircraft, for example, the trailing edges and the tips of the wings and vertical and horizontal stabilizers, such that corona discharges will occur from the static dischargers rather than from locations on the aircraft which are more strongly coupled to the aircraft antenna. Due to these physical locations of mounting, these static dischargers of various prior art types are subjected to severe environmental conditions such as snow and rain, wind buffeting, vibrations, whipping, etc. In addition, these static dischargers extend out from the wing and stabilizer edges and are thus subject to damage during craft maintenance and the like. Under such conditions, the static dischargers must be strong enough to withstand the most severe environmental conditions and have long life, yet be light weight, retain their necessary electrical characteristics, and must be easily and economically fitted to and replaceable on existing and new aircraft.

The base mounting member of the present invention is arranged and adapted so as to be readily and rapidly permanently affixed to the desired aircraft locations and provide for a rapid attachment and detachment of the various forms of static discharge members now in present day use. These novel base mounting members also are arranged and designed so as to be readily adaptable to many different forms of static dischargers and thus provide for ready substitution of static dischargers.

It is, therefore, the principal object of the present invention to provide a light weight, long life, easily mountable base mounting member arranged to be fixedly secured to desired surfaces, for example, airplane wing tips and the like, said base mounting members being suitably arranged for removably carrying static dischargers and the like.

One feature of the present invention is the provision of a base mounting member for mounting static dischargers which is strong, light weight, electrically compatible with aircraft wing surfaces and the like, and which provides thereon a suitable arrangement for removably securing static dischargers thereto.

Figure 5:
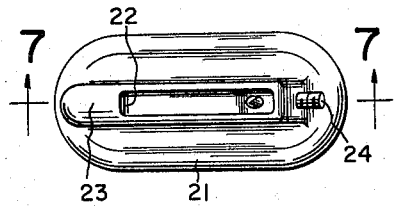
Figure 2:
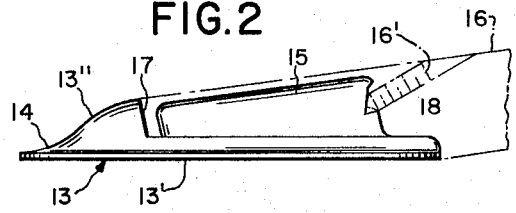
Figure 6:
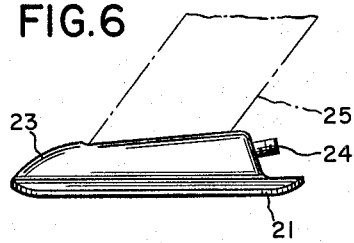
Figure 3:
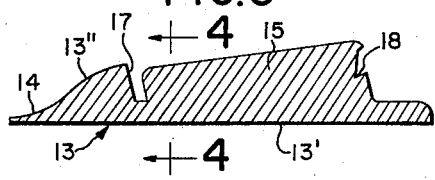
Figure 7:
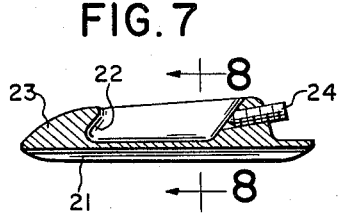
Figure 4:
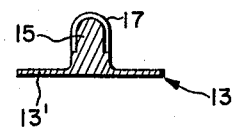
Figure 8:
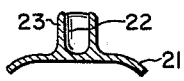

These and other objects and advantages of the present invention will become more apparent from a perusal of the following specification, taken in connection with the drawings, wherein:

FIG. 1 is a plan view of one form of base mounting member which utilizes the present invention, FIG. 2 is an elevation view of a base member of FIG. 1, FIG. 3 is a cross-sectional view of the base member of FIG. 1 taken along section line 3—3 therein, FIG. 4 is a cross-sectional view of the base member of FIGS. 1, 2, and 3 taken along section line 4—4 in FIG. 3, FIG. 5 is a plan view of another embodiment of the present invention, FIG. 6 is an elevation view of the novel base member of FIG. 5, FIG. 7 is a longitudinal cross-section view of the base member of FIG. 5 taken along section line 7—7 therein, and FIG. 8 is a transverse cross-section view of the base member of FIGS. 5, 6, and 7 taken along section line 8—8 in FIG. 7.

Referring now to FIGS. 1 through 4, there is shown one embodiment of the present invention suitable for mounting on the plane surface of an aircraft such as the trailing edges of wings and stabilizers. In practice, a suitable number of such bases would be firmly affixed to the aircraft at the desired locations. It should be understood that the exact number and location of these bases which will be utilized for mounting static discharges is determined by the construction, the configuration, etc., of the particular aircraft in accordance with the general principles of such type dischargers as is well known in the prior art. The base mounting member or retainer base 13 is made up of a strong light weight metal such as aluminum. This retainer base may be plated, preferably with an electroless nickel plating, to insure corrosion resistance and to eliminate aluminum-to-aluminum contact when mounted on the aircraft wing or the like, which could result in formation of an aluminum oxide film between the retainer base and the wing surface resulting in a reduction in the desired high surface conductivity, i.e. low D.C. resistance between wing and base retainer. The base includes a wide, relatively flat portion 13' and a narrow riser portion 13", the wide flat portion 13' serving as the mounting surface by which the base is secured, for example, by an electrically conductive adhesive, to the desired mounting surface such as the wing trailing edge. The relatively large contact area between the wing trailing edge and the retainer base, due to the enlarged flat portion 13', ensures high electrical conductivity at this junction and a large bonding area for highest shear strength. The edges of the base portion 13' may be feathered slightly to distribute the stress, that is, to prevent stress concentration at the edges of the base portion 13'. The wide surface also permits this base member to be fastened to the wing surface by rivets if so desired.

The riser portion 13" of the base mounting member has a rounded front edge 14 to reduce wind drag and a central portion 15 having a reduced cross-sectional area which serves as a mount and support pedestal for the associated static discharger which one desires to mount on the base member, for example, an electroless nickel plated aluminum cover 16 shown in dot-dash lines and corresponding to the form of static discharger disclosed and discussed in the parent application. The base riser 13" is provided with a slanted recess or slot 17 into which a forward wall cover 16 may be positioned when mounting the cover 16 on the base 13. The base riser 13' also includes a small recess 18 into which the inner end of a set screw 16' or the like located in the static discharger retainer cover 16 may be fitted. The base member 13 is so arranged that the static discharger which is mounted thereon may fit snugly over the base portion 15, and the set screw in the static discharger 16 on tightening serving to pull the forward wall of the base member securely into the slanted slot 17 of the base member. The slight incline to the slot 17 results in an increase in the gripping force of the static discharger 16 on the base 13 with increase in wind drag and the like. The particular shape of the base member, when utilized in association with any desirable static discharger, i.e. narrow and high with rounded streamlined forward contour and flush surface mounting on the wing trailing edge, insures minimum weight and wind-drag surface and yet substantial strength, and also sufficient surface contact area between base 13 and the static discharger to insure sufficient electrical conducivity to handle the maximum current flow occurring, for example, in lightning discharges from the aircraft, without welding the base 13 and the static discharger mounted thereon together.

Referring now to FIGS. 5 through 8, there is shown another embodiment of the present invention more suitable for securing static discharge members of various types to the wing tips or outer curved extremities of aircraft and the like. The base member of this embodiment includes a wide portion 21 which, as better seen in FIG. 8, is slightly curved to more readily conform to the curved surface area found at wing tips and the like. The wide surface area of this base again, like that base shown in FIGS. 1 through 4, provides a relatively large contact area between the wing and the retainer base, thereby insuring a high electrical conductivity at this junction and a large bonding area for highest shear strength. Again, the edges of the base are feathered slightly to distribute the stress and prevent stress concentration at the edges where the base contacts the wing tip. This wide base also permits fastening by rivets if desired. In this embodiment the base member is provided with a slanted well 22, located in the streamlined riser portion 23. The forward edge of the well 22 slants forwardly so that the mounting screw 24 threaded into the rear of the riser portion 23 will more securely force the desired static discharger 25 shown in dot-dash lines into the base mount or retainer 21 when mounted on the aircraft or the like. As with the case of the base shown in FIG. 1, the base 21 is made of a light weight material such as aluminum and when planned to be utilized on an aluminum aircraft, is preferably coated as described above for the reasons set forth above.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A base mounting member arranged for mounting static dischargers on surfaces such as aircraft wing trailing edges, said base mounting member being of substantially oval shape and having a large under surface portion for providing good physical and electrical contact with the aircraft surface, said mounting member having a central riser portion extending upwardly therefrom and provided with a streamlined rounded forward part and a rear part of reduced thickness so as to mount on the latter a static discharger in easily removable fashion, such static discharger surrounding said rear riser part and merging smoothly into said larger riser forward part.

2. A base mounting member as claimed in claim 1 wherein said riser portion reduced rear part is separated from its forward part by an upwardly and forwardly inclined slot, said riser rear part having an upwardly and rearwardly inclined slot at its rear to receive a fastening member carried by the static discharger, said opposing inclined slots in cooperation with the fastening member serving to securely lock the static discharger upon said riser portion.

References Cited by the Examiner
UNITED STATES PATENTS

| | | | |
|---|---|---|---|
| 2,466,311 | 4/1949 | Hall | 317—2 |
| 2,536,818 | 1/1951 | Lawton | 317—2 |
| 3,034,020 | 5/1962 | Benkoczy et al. | 317—2 |
| 3,170,087 | 2/1965 | Tanner et al. | 317—2 |

MILTON O. HIRSHFIELD, *Primary Examiner.*

STEPHEN W. CAPELLI, *Examiner.*

D. YUSKO, L. T. HIX, *Assistant Examiners.*